United States Patent
Gil et al.

(10) Patent No.: US 8,134,547 B2
(45) Date of Patent: Mar. 13, 2012

(54) MERIT BASED GAMUT MAPPING IN A COLOR MANAGEMENT SYSTEM

(75) Inventors: Alvaro E. Gil, Rochester, NY (US); Lalit K. Mestha, Fairport, NY (US); Martin S. Maltz, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 887 days.

(21) Appl. No.: 12/177,178

(22) Filed: Jul. 22, 2008

(65) Prior Publication Data
US 2010/0020106 A1    Jan. 28, 2010

(51) Int. Cl.
 *H04N 1/60* (2006.01)
 *G06K 9/00* (2006.01)
 *G06T 15/30* (2011.01)
(52) U.S. Cl. .................. 345/207; 345/423; 382/162
(58) Field of Classification Search .............. 345/590, 345/589, 602, 604, 207, 423; 358/1.9, 523, 358/3.23, 1.16, 518, 504; 382/162
See application file for complete search history.

(56) References Cited

U.S. PATENT DOCUMENTS

| | | | |
|---|---|---|---|
| 5,483,360 A * | 1/1996 | Rolleston et al. | 358/518 |
| 5,734,802 A * | 3/1998 | Maltz et al. | 358/1.9 |
| 6,947,589 B2 * | 9/2005 | Newman et al. | 382/162 |
| 2002/0154325 A1 * | 10/2002 | Holub | 358/1.9 |
| 2002/0159081 A1 * | 10/2002 | Zeng | 358/1.9 |
| 2003/0020703 A1 * | 1/2003 | Holub | 345/207 |
| 2004/0004731 A1 * | 1/2004 | Itagaki | 358/1.9 |
| 2004/0130546 A1 * | 7/2004 | Porikli | 345/423 |
| 2005/0036159 A1 * | 2/2005 | Sharma et al. | 358/1.9 |
| 2005/0249402 A1 * | 11/2005 | Tin | 382/162 |
| 2006/0072128 A1 * | 4/2006 | Ng et al. | 358/1.9 |
| 2006/0193017 A1 * | 8/2006 | Zuber | 358/504 |

OTHER PUBLICATIONS

Braun, et al., Development and Evaluation of Six Gamut-Mapping Algorithms for Pictorial Images; The Seventh Color Imaging Conference: Color Science, Systems, and Applications Putting It All Together; Nov. 1999.*
Zolliker, et al.; Continuity of gamut mapping algorithms; Journal of Electronic Imaging; Jan. 2006.*
Montag, et al.; Gamut Mapping: Evaluation of Chroma Clipping Techniques for Three Destination Gamuts; The Sixth Color Imaging Conference: Color Science, System, and Applications; Nov. 1998.*

(Continued)

*Primary Examiner* — Quan-Zhen Wang
*Assistant Examiner* — Michael J Eurice
(74) *Attorney, Agent, or Firm* — Philip E. Blair; Fleit Gibbons Gutman Bongini & Bianco P.L.

(57) ABSTRACT

What is disclosed is a system and method for merit-based gamut mapping. In one embodiment, color points are clustered in regions of interest within a color space. Each cluster is associated with a gamut mapping function and a merit function. Mapping parameters of each gamut mapping function are iteratively varied to optimize the values based on the merit function value. An optimized gamut mapping function results. Optimized gamut mapping functions of adjacent clusters are blended together by blending the value of the gamut mapping function for a point of a cluster with a value produced by the gamut mapping function of an adjacent cluster for that color point. The composite gamut mapping function contains the optimized gamut mapping functions of all clusters is then output for use in mapping points within those clusters to points within the target gamut. The composite gamut mapping function exploits local advantages of each cluster.

20 Claims, 5 Drawing Sheets

OTHER PUBLICATIONS

Zolliker, et al., "Continuity of gamut mapping algorithms," *Journal of Electronic Imaging*, Jan.-Mar. 2006, pp. 1-12, vol. 15(1).

Montag, et al., "Gamut Mapping: Evaluation of Chroma Clipping Techniques for Three Destination Gamuts," *The Sixth Color Imaging Conference: Color Science, Systems, and Applications*, pp. 57-61, Publication Year 1998.

Braun, et al., "Development and Evaluation of Six Gamut-Mapping Algorithms for Pictorial Images," *IS&T/SID Seventh Color Imagaing Conference: Color Science, Systems and Applications (including CD)*, Scottsdale, Arizona: Nov. 1999: pp. 1-6: ISBN/ISSN: 0-89208-224-0.

\* cited by examiner

MERIT BASED GAMUT MAPPING IN A COLOR MANAGEMENT SYSTEM

TECHNICAL FIELD

The present invention is directed to systems and method for optimizing a gamut mapping function used to map color points to points in a target gamut.

BACKGROUND

In digital imaging systems, color management is the controlled conversion between the color representations of various devices, such as image scanners, digital cameras, monitors, TV screens, film printers, marking devices, offset presses, and corresponding media. One of the primary goals of color management is to obtain a good match across color devices; for example, a video which should appear the same color on a computer LCD monitor, a plasma TV screen, and on a printed frame of video. Color management helps to achieve the same appearance on all of these devices, provided the devices are capable of delivering the needed color intensities.

Mapping of color spaces to the target color points of different target devices is used since many devices don't have the same gamut, or range of colors and brightness, that they are able to produce. For example, some colors outside of a target device's gamut need to be shifted to the inside of the gamut as they otherwise cannot be represented on the output device and would simply be clipped. For instance, printing a mostly saturated blue color as displayed on a monitor to a paper output using a typical CMYK printer will likely fail. The paper blue may not be that saturated. Conversely, the bright cyan of an inkjet printer may not be easily presented on an average computer monitor. The color management system can utilize various methods to achieve desired results and give experienced users control of the gamut mapping behavior.

Color mapping functions can be used to adjust the numerical values that are sent to, or received from, different devices so that the perceived color they produce remains consistent. A computer program that sends a signal to the computer's graphic card in the form RGB (Red, Green, Blue) 255,0,0, signals only a device instruction, not a color itself. This instruction then causes the connected display to show Red to the maximum achievable brightness, while the Green and Blue components of the display remain dark. The resultant color being displayed depends on two main factors: 1) the phosphors or crystals actually producing a light that falls inside the red spectrum and 2) the overall brightness of the color resulting in the desired color perception.

Every output device will have its unique color signature, displaying a certain color according to manufacturing tolerances and material deterioration through use and age. One challenge is dealing with a color that cannot be reproduced on a certain device in order to show it through a different device as if it were visually the same color, just as when the reproducible color range between color transparencies and printed matters are different. There is no common method for this process, and performance often depends on the capability of each color mapping method. There is no unique gamut mapping method that satisfies all requirements for image reproduction, such as pleasing color, contrast, lightness, chroma, hue, and the like. Some gamut mapping algorithms offer feature enhancements in one region of the gamut. Other gamut mapping algorithms do the same in other regions of the gamut. As such, device designers generally compromise in the gamut mapping functions they employ in their respective color management systems.

Accordingly, what is needed in this art are increasingly sophisticated systems and methods which automatically optimizes gamut mapping functions used to map input color points to points in a target gamut when rendering chromatic colors in the image path of a color management system.

BRIEF SUMMARY

What is provided is a novel system, method, and computer program product for optimization of a color space mapping function using merit based feedback. In the present method, color points are clustered in different regions of interest within the color space and each cluster is associated with at least one candidate gamut mapping function. A merit function is associated with each cluster. Clusters having gamut mapping functions having associated mapping parameters have the associated mapping parameters iteratively varied so as to optimize those parameter values based on the merit function value. Once optimal associated mapping parameters are determined, an optimized gamut mapping function is determined for that cluster. The optimized gamut mapping functions of adjacent clusters are then blended together to generate a composite gamut mapping function which collectively exploits the local advantages of each cluster. Through an implementation of the present method, a composite gamut mapping function is produced that improves various characteristics such as colorfulness and that improves detail in the output print. In such a manner, the degree of colorfulness is improved and the loss of detail for chromatic colors near the gamut boundary is effectively reduced. The composite gamut mapping function is outputted for use in color mapping applications.

In one example embodiment, clusters of individual color points in regions of interest within a color space are defined. A gamut mapping function is associated with each cluster. The gamut mapping function defines a point within a target gamut corresponding to the respective color point within each respective cluster. At least one merit function is associated with each cluster. The merit function determines at least one merit function value. In one embodiment, the merit function comprises any of a mean squared error among color difference values, a weighted average of color difference values, and a sum of color difference values, and the merit function value is determined by a color difference value between at least one color point in the cluster and the corresponding point within the target gamut produced by the respective gamut mapping function for the cluster. For each cluster, the respective gamut mapping functions are optimized based on the merit function value. In one embodiment, the gamut mapping functions are optimized by an iterative process involving repeatedly adjusting mapping parameter values associated with the respective gamut mapping function and determining the merit function value from the adjusted mapping parameter values until an optimized gamut mapping function has been achieved. In one embodiment, multiple candidate gamut mapping functions are associated with at least one cluster and optimizing the gamut mapping function selects an optimum gamut mapping function, based on the merit function value, from among the multiple candidate gamut mapping functions. Thereafter, the optimized gamut mapping functions of adjacent clusters are blended. In one embodiment, optimized gamut mapping functions are blended by blending at least one mapping parameter value of a first gamut mapping function associated with a first cluster with at least one mapping parameter value of a second gamut mapping function associated with a second cluster adjacent to the first cluster for the same color point. Optimized gamut mapping functions can also be blended by altering a first gamut mapping function associated with a first cluster to incorporate a weighted value of the gamut mapping function associated with the adjacent cluster. A composite gamut mapping function is output which comprises the gamut mapping function for each respective cluster within the plurality of clusters. The composite gamut mapping function can then be used to map color points to a point within the target gamut. Other embodiments are provided.

The foregoing and other features and advantages will be apparent from the following more particular description of the preferred embodiments of the invention, as illustrated in the accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

Figure 1:
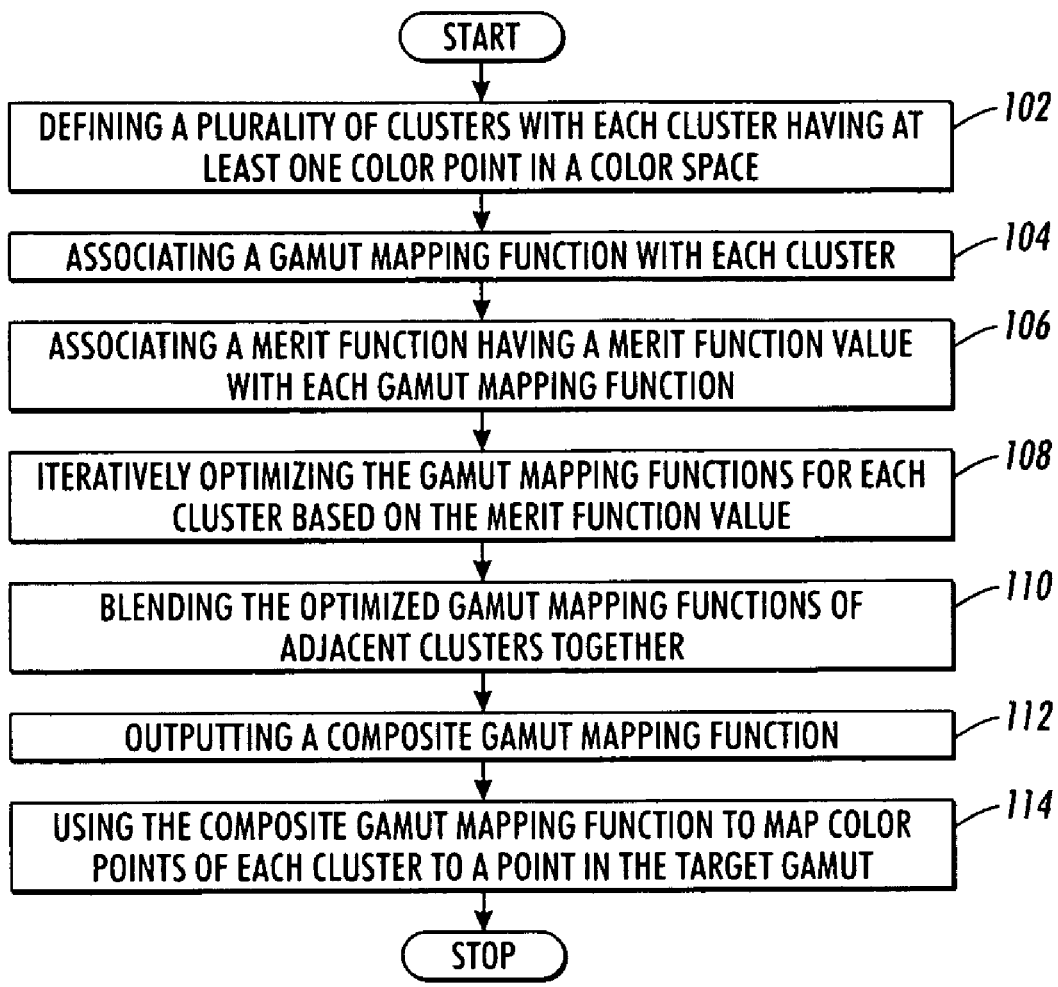
FIG. 1 illustrates one example flow diagram of the present method for optimizing a merit-based composite gamut mapping function.

What is provided is a system and method utilized a merit-based optimization technique which optimizes gamut mapping functions. The optimized gamut mapping functions for individual clusters are blended to produce a composite gamut mapping function optimum for clusters of color points in regions of interest within defined clusters in a color space. The composite gamut mapping function is outputted from the system and method for use in mapping individual color points within those clusters to points in a target gamut.

It should be understood that one of ordinary skill in this art would be readily familiar with many facets of color science such as, but not limited to, color space, color gamuts, gamut mapping, and other related techniques and algorithms commonly found in the color science arts. Additionally, one of ordinary skill would also be familiar with advanced mathematical techniques used for color manipulation and various color transformation processes. One of ordinary skill would also be knowledgeable about computer science and software and programming systems and methods sufficient to implement the functionality and capabilities described in detail herein in their own hardware environments without undue experimentation.

A "color model" is an abstract mathematical model describing the way colors can be represented as tuples of numbers, typically as three or four values or color components. RGB and CMYK are examples of widely known color models. A color model with no associated mapping function to an absolute color space is essentially an arbitrary color system with no connection to any globally understood system of color interpretation. Adding a mapping function between the color model and a certain reference color space results in a definite footprint within the reference color space. This footprint is referred to as a gamut, and, in combination with the color model, defines a new color in the target gamut. In the generic sense, color spaces can be defined without the use of a color model. Spaces, such as Pantone, are in effect a given set of names or numbers which are defined by the existence of a corresponding set of physical color swatches.

A Lab color space is a color-opponent space with dimension L* for luminance and a and b for the color-opponent dimensions based on non-linearly compressed CIE XYZ color space coordinates. Lab color space is more often used as an informal abbreviation for the CIE 1976 (L*a*b*) color space (also called CIELAB, whose coordinates are L*,a*,b*). A process color refers to all colors that are a combination of primary colors and includes secondary colors (with 2 primary colors involved) and process black (with the same amount of 3 primary colors involved). Primary colors are understood to include cyan, magenta, yellow, and black (CMYK).

A "color gamut" g(or gamut) refers to a set of colors that can be produced by a printing device or via a display device, as more particularly defined below. A color gamut can also refer to a subset of colors that are present in a print job or a portion of a print job such as, for example, a section, a page, an image, an object, or the like. A color transformation refers to the process of translating an input color space to an output color space. In conventional color management systems, a color transformation converts each input color space for a print job, on a color by color basis, into an output target color space using mathematical algorithms typically represented by multiple color profiles. The mathematical algorithms of the color profiles for a color transformation may be convoluted to produce a single mathematical algorithm for increased efficiency.

A print device is understood to be any device capable of receiving commands to render text, graphics, images, and the like, onto a media substrate such as paper. Print devices include production printers, xerographic devices, facsimile machines and other document reproduction devices. A color device is understood to be any device capable of displaying a color image or outputting a color signal. Such devices include color printers, color displays, and the like. An image input device is a device capable of receiving an image or color signal and provided data defining a version of the image. A scanner is one example of an image input device used to receive an image by a scanning operation well known in the arts. An image output device is a device capable of reducing a received image or color signal to an output form. Example output devices include any device known in the arts that displays or otherwise renders an image in viewable form. The viewable pattern presented is a displayed image, an output image, or simply referred to as an "image". To render an image is to print, display, or otherwise form the image on a substrate through the visual integration of colorants (e.g., inks, toners, pigments, etc.).

As stated in the background section hereof, no single unique gamut mapping strategy is able to be applied to a color space which simultaneously satisfies all requirements such as pleasing color, contrast, lightness, chroma, hue, and the like, across all out-of gamut color points. The present method capitalizes on the advantages provided by gamut mapping functions for differing clusters by iteratively driving the mapping parameters of these functions to an optimum state utilizing a merit function. The individual optimized gamut mapping functions of adjacent clusters are then blended together, in accordance with the teachings hereof, to produce a composite gamut mapping function that is outputted for use in color space mapping. In such a manner, a composite gamut mapping strategy is produced which collectively exploits the local advantages of each cluster. The degree of colorfulness is improved and the loss of detail for chromatic colors near the gamut boundary is reduced.

Reference is now being made to FIG. 1 which illustrates one example flow diagram of the present method for optimizing a merit-based composite gamut mapping function. One embodiment of the present invention operates by optimizing a number of candidate gamut mapping functions according to the example flow diagram of the present method. After the following optimization of each candidate gamut mapping function, one embodiment selects the optimized gamut mapping function with the optimum merit function value.

In the example embodiment, at step 102, a plurality of clusters in a color space is defined wherein each cluster has at least one color point. The clusters are defined in a manner as described herein further. At step 104, a gamut mapping function is associated with each cluster. Each gamut mapping function defines a point within a target gamut corresponding to the respective color point within each respective cluster. At step 106, a merit function is associated with each cluster. The merit function determines a merit function value by a color difference value between at least one color point in the cluster and the corresponding point in the target gamut produced by the respective gamut mapping function for the cluster. At step 108, the gamut mapping function for each respective cluster is iteratively optimized based on the merit function value. At step 110, the gamut mapping functions of adjacent clusters are blended together. At step 112, a composite gamut mapping function is output which comprises the gamut mapping function for each respective cluster within the plurality of clusters. At step 114, the composite gamut mapping function is used to map color points to points in the target gamut.

The present method effectively utilizes a close-loop processing technique to iteratively drive the mapping parameters of the individual gamut mapping functions to an optimal value. The closed loop processing technique tunes various mapping parameters based on clusters of out-of-gamut color points. A number of different candidate gamut mapping functions are iterated for each defined cluster within the color space. The loop repeats for all gamut mapping functions being evaluated. A composite gamut mapping is created that specifies color level mapping for points outside the target gamut.

Closed loop processing is performed for defined color space clusters that encompass all input color levels that are outside the target color gamut for which the gamut mapping is being created. The closed loop processing technique can also be performed when developing a color profile for a particular gamut mapping, such as when developing a gamut map for a new input color space or a new target gamut associated with, for example, a different print or copy or other image output device, as defined above. One example closed loop processing technique is described with reference to FIG. 2.

Figure 2:
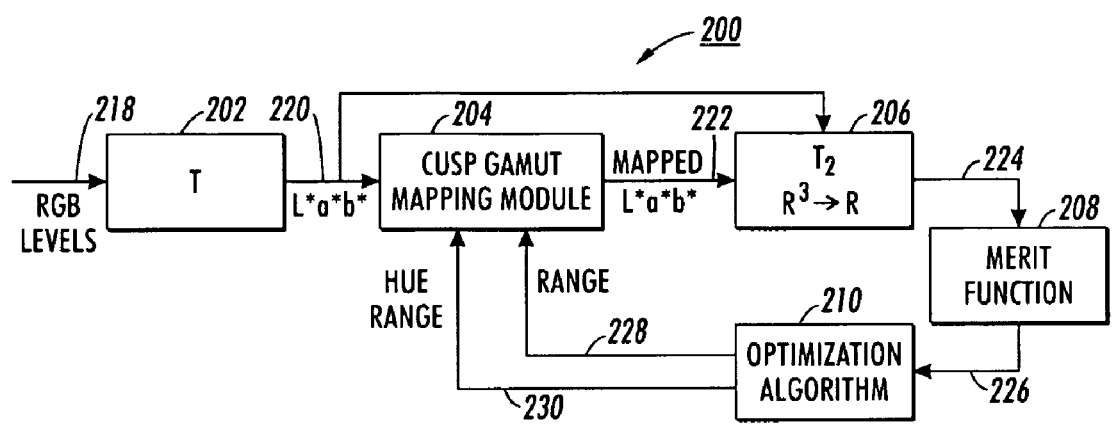
FIG. 2 illustrates one example embodiment of a closed loop technique to optimize gamut mapping parameters in accordance with the present method.

Reference is now being made to FIG. 2 which illustrates one example embodiment of the closed loop processing of the present method.

The closed loop processing technique 200 has a color space transform block T 202 that accepts the RGB color levels defining colors in a given cluster. The color space transform block T produces a transformed color representation of the colors. In the illustrated example, the color space transform block T produces $L^*a^*b^*$ transformed colors 220 that represent the input RGB color levels that are transformed to the $L^*a^*b^*$ color space. The $L^*a^*b^*$ transformed colors are further processed by the various candidate mapping functions under consideration such as, for example, the cusp gamut mapping module 204, to produce mapped $L^*a^*b^*$ values 222.

In this example, the cusp gamut mapping algorithm is a candidate gamut mapping function for the cluster being processed. The cusp mapping algorithm of this example has two mapping parameters, a "hue range" 230 and range 228 parameter. The hue range is understood to be the amount the hue that can be shifted to get a more saturated color. The cusp gamut mapping algorithm module 204, or any gamut mapping function selected to map input color space values to a target gamut range, is able to include at least one mapping parameter such as hue and range. Other parameters may be used depending on the gamut mapping function. It should be appreciated that any suitable gamut mapping algorithm is able to be processed by the present method. The various embodiments of the present method operate to optimize, for each candidate gamut mapping function having variable parameters, the value of the mapping parameters used for each cluster within the input color space.

The closed loop technique 200 processes input color points in the current cluster to optimize the gamut mapping function parameters, such as hue range and range values, used for the currently selected gamut mapping function associated with the current cluster. The closed loop 200 performs a brute force calculation using input RGB level color points 218 that are within the cluster being processed. Optimum parameters are determined for the candidate gamut mapping functions that are iterated for the defined clusters within the color space.

The closed loop processing technique 200 includes a "$T_2$" processing block 206 that processes each color point within a defined cluster of the input color space. The $T_2$ block accepts the $L^*a^*b^*$ transformed colors produced by the transform block T 202. In the illustrated example, a color space difference is determined between each of the $L^*a^*b^*$ transformed color levels 220 and the associated target gamut color level 222 for each color point within the cluster being processed. The $T_2$ block maps the $L^*a^*b^*$ values that correspond to each input color space color level to a one dimensional function for each color point. In one embodiment, processing block $T_2$ is based on the deltaE2000 formula but other suitable processing block functions known in this art can also be used. An alternative embodiment allows the definition of additional and/or different processing function sub-blocks within the $T_2$ block for each different cluster being processed.

The merit function block 208 takes all of the produced one dimensional values associated with each of the color points within the input color space 220 in the currently processed cluster and converts that combination of $L^*a^*b^*$ values to a single value. The merit function is selected to reflect what the device designers want to achieve during optimization as determined by their own needs. The single value produced by the merit function is the merit function value 226. The merit value 226 represents the numeric merit of the various mapping parameters, such as the range value 228 and the hue range 230, used for that iteration of the currently processed cluster and gamut mapping function used to produce the one dimensional output values of the $T_2$ block. In one embodiment, the merit function value is based on a color space difference between each color space point within the cluster being processed and a corresponding point defined by the respective gamut mapping function associated with that cluster. Another embodiment hereof supports unique merit functions for each different cluster or region of the input color space. Other embodiments simply use the same merit function or selectively implement merit functions based on pre-established goals and objectives set by the device designers prior to an operation of the present method.

An optimization block 210 manipulates the gamut mapping parameters for different iterations of processing a particular input color level cluster with, by example, the cusp gamut mapping algorithm and the $T_2$ block. An optimum value is determined for the mapping parameters of the particular gamut mapping function to generate the "best," or optimum, merit function value for each cluster. A determination as to what constitutes the "best" is pre-defined by the designers depending on the requirements of their color management system. The optimum merit function value being reached or exceeded exits the iterative loop for that gamut mapping function for the cluster being processed. Once the optimum merit value has been obtained by iterative adjustment of the mapping parameters, processing proceeds to the next cluster. The next cluster is defined by another set of color points in the input color space and has its own associated gamut mapping function and parameters.

The gamut mapping optimization can be modified to evaluate a merit function value for candidate gamut mapping functions that do not have variable mapping parameters. The gamut mapping optimization is able to determine merit function values for gamut mapping functions with parameters that have already been optimized by other functions performed outside the iterative loop. Other strategies can be implemented by the optimization block in cases, for instance, where a considerable number of individual or custom gamut mapping functions and mapping parameters need to be iteratively adjusted to determine an optimum state. Various optimization algorithms known in the art can be alternatively or additionally employed to determine an optimum mapping parameters of candidate gamut mapping functions, as would be known to practitioners of ordinary skill in the art in light of the present discussion. Furthermore, all of the above can be performed for more than one gamut mapping function for each cluster in the input color space.

One example of the above closed loop involves twelve defined clusters that are each associated with the above-described cusp gamut mapping function. The transformation block $T_2$ of this example includes a deltaE2000 formula, which is to say that a deltaE2000 mapping is being emulated. A mean squared error function is used as the merit function. The merit function determines the mean squared error of the values calculated using the deltaE2000 function for each color point in a particular cluster. The deltaE2000 function calculates distances between the L*a*b* transformed pixels 220 and the mapped L*a*b* values 222 for each point of the current cluster in the input color space. In this example, the optimization algorithm uses a brute-force approach. A brute-force approach in many instances does not take much time to generate the final results given present processor speeds.

Figure 3:
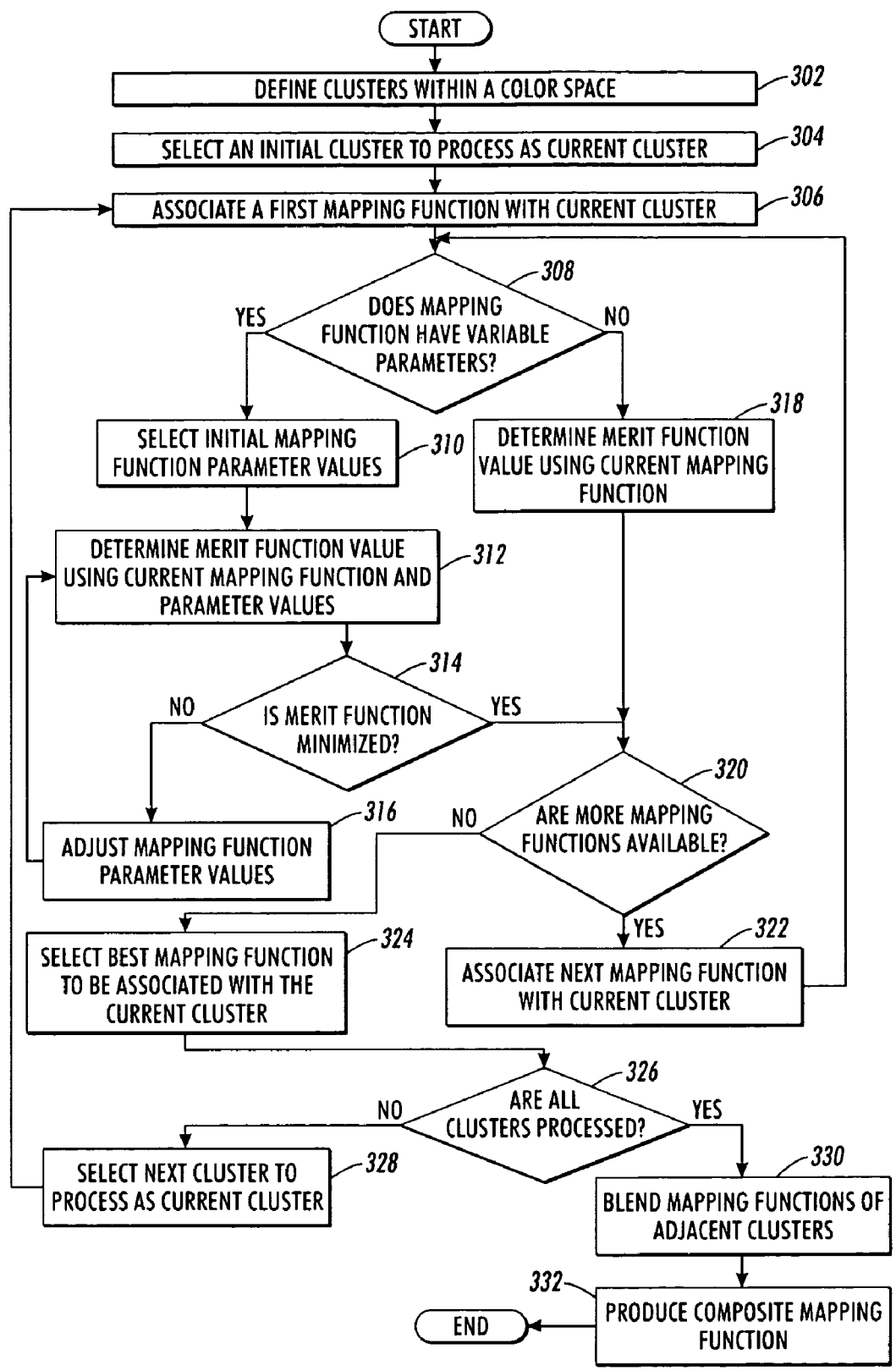
FIG. 3 illustrates one embodiment of a flow diagram of the present method which performs the closed loop of FIG. 2 for each defined cluster and for each candidate gamut mapping function that is to be evaluated for that cluster.

Reference is now being made to FIG. 3 which illustrates one example embodiment a diagram of a gamut mapping optimization flow which performs the closed loop processing technique of FIG. 2 for each defined cluster and for each respective candidate gamut mapping function to be evaluated for each cluster.

The gamut mapping optimization flow diagram 300 begins by defining, at step 302, clusters within an input color space. One example method for defining clusters will be discussed herein further with respect to FIG. 4. The operation of the optimization flow diagram is able to allow the definition of any type of point clusters within the input color space. For instance, a subset of the defined clusters may only have or include areas of the input color space that are outside of the target gamut range while other clusters include areas inside the target gamut range. Others may be near the boundary of the target gamut but inside the target gamut range. Alternatively, clusters may be defined only for areas that are outside of the target gamut range. One embodiment hereof uses a vector quantization algorithm in L*a*b* space for a cluster of 33^3 nodes to define groups of out-of-gamut colors into a number of clusters.

At step 304, an initial cluster within the defined clusters is selected to be processed as the current cluster. The end-user hereof would select the clusters to be processed and the order of processing. At step 306, an initial mapping function from within a set of candidate mapping functions is selected to be the current gamut mapping function associated with the current cluster being processed. The candidate gamut mapping function defines a point within the target gamut that corresponds to each color point in the defined cluster with which it is associated. At step 308, a determination is made whether the current gamut mapping function associated with the current cluster has at least one variable parameter. If the current gamut mapping function does not have at least one variable parameter, at step 318, a merit function value is calculated. In one example, the merit function value is based on distances determined between color points in the current cluster and corresponding points within the target gamut calculated for each point according to the candidate gamut mapping function associated with the current cluster. In the case wherein the current candidate gamut mapping function does not have any variable mapping parameters, a merit function value is obtained (pre-defined) and processing proceeds to step 320, wherein a determination is made whether more candidate gamut mapping functions for the current cluster are available.

At step 310, processing proceeds by selecting mapping parameters for the current candidate gamut mapping function. Initial values for the mapping parameters are provided by an operator prior to performing the present optimization method or are otherwise configured as default values prior to optimization. At step 312, a merit function value is determined based on distances between points in the current cluster and corresponding points within the target gamut calculated for each of those points according to the gamut mapping function associated with the current cluster. Alternatively, a default merit function value is set for each candidate gamut mapping function associated with each cluster.

At step 314, a determination is made whether the merit function has been minimized to a predetermined value. Various embodiments utilize different criteria to determine whether the merit function value has been reached a desired value. Some embodiments utilize characteristics of the merit function and determined or observed sensitivity to mapping parameters and a merit function transfer function. Other embodiments use multiple iterations of determining various merit function values based on the iteratively adjusted mapping parameters to produce a desired change of the output merit function value between adjustment iterations to a defined level. Alternative embodiments are envisioned.

If, at step 314, the merit function was not determined to have been reduced to a desired optimal value, at step 316, the mapping parameter values for the current gamut mapping function are adjusted. The gamut mapping optimization flow diagram performs parameter adjustment iterations by returning to step 312, wherein another determination is made whether the merit function value has been achieved for the newly adjusted mapping parameters. Once the merit function value has been minimized for the current candidate gamut mapping function, the mapping parameters used for that iteration to determine the merit function value are determined to be the optimum value of the mapping parameters to use with that gamut mapping function for that cluster.

At step 320, a determination is made whether more candidate gamut mapping functions are to be processed for the current cluster. A number of candidate gamut mapping functions can be specified, for example, by pre-defining these gamut mapping functions prior to performing the optimization flow diagram of the present method. If, at step 320, more candidate gamut mapping functions are available then, at step 322, the next candidate mapping function associated with the current cluster is obtained. The processing then returns to step 308 for again determining whether the current gamut mapping function has variable parameters. Processing repeats in a manner previously described. If, at step 320, no more candidate gamut mapping functions are to be processed then, at step 324, the optimized gamut mapping function, e.g., the gamut mapping function with the optimally adjusted mapping parameters, is selected to have achieved the desired "best" merit function value. The selected gamut mapping function with the optimally adjusted mapping parameters is then associated with the current cluster. This candidate gamut mapping cluster needs no further processing.

At step 326, a determination is made whether all clusters that have been defined for the input color space have been processed. If all clusters have not been processed, at step 328, the next defined cluster is selected to be processed as the current cluster. The gamut mapping optimization flow performs another iteration by returning to step 306 wherein the candidate gamut mapping function associated with the current cluster is obtained. Processing repeats.

If all clusters have been processed then, at step 330, the mapping functions of adjacent clusters are blended. One embodiment blends the mapping functions of two clusters at a time using techniques described in U.S. Pat. No. 5,483,360 to Rolleston et al. and U.S. Pat. No. 5,734,802 to Maltz et al., both of which are hereby incorporated herein by reference. In another embodiment, the values of the mapping parameters for their respective clusters are blended in a weighted combination consisting of a weighted value of the gamut mapping function and optimum mapping parameters for that cluster added to a weighted value of the gamut mapping function of an adjacent cluster using one or more of the adjacent cluster's optimum mapping parameters.

Blending the mapping functions of two adjacent clusters, referred to as cluster 1 and cluster 2, is described below by way of example.

The two adjacent clusters are each associated with different gamut mapping functions. The blending process blends the value of the gamut mapping function for some points of each cluster with a value provided by the gamut mapping function of the adjacent cluster for that point. The mapping values of the input color point that are produced using the gamut mapping function and optimized mapping parameters selected for cluster 1 are denoted as $L^*a^*b^*_{mp1}$ and those selected for cluster 2 are denoted $L^*a^*b^*_{mp2}$. In one example, the blended gamut mapping function to be used for the composite gamut mapping function is given by:

$$L^*a^*b^*_{new} = a(L^*a^*b^*)^*L^*a^*b^*_{mp1} + (1-a(L^*a^*b^*))^*L^*a^*b^*_{mp2}$$

In the above, $L^*a^*b^*_{new}$ is the $L^*a^*b^*$ value that is stored for the blended gamut mapping function output value and that is stored, for instance, in a look up table at a location that corresponds to the input color point. The $L^*a^*b^*_{mp1}$ and $L^*a^*b^*_{mp2}$ values are the corresponding points within the target gamut produced by the optimized gamut mapping function for cluster 1 and the optimized gamut mapping function for cluster 2, respectively, for a given input color point. The value $a(L^*a^*b^*)$ is a corresponding weighting factor, a number between 0 and 1, for the input color point location within the input color space. The value of $a(L^*a^*b^*)$ is generally related to the location of the input color point within its defined cluster. For example, the value of $a(L^*a^*b^*)$ is defined as having a high value in the center of a defined cluster and decreases in value as color points approach a boundary of the defined cluster. In this example, it is desired that the composite mapping function produced retain the characteristics of the gamut mapping function for cluster 1 to the extent possible. Thus, weighting factor $a(L^*a^*b^*)$ has a large value in the parts of color space where the characteristics of the mapping function for cluster 1 are desired, and is small elsewhere. A smooth transition from high to low valued regions is required to prevent contours.

One method for defining values for the weighting function $a(L^*a^*b^*)$ is to define the region with all the $L^*a^*b^*$ values contained within the current cluster to have a high value for the $a(L^*a^*b^*)$ function. This can be achieved by setting the function value to 1. The nodes of the $a(L^*a^*b^*)$ function that lie within the gamut are set to 1, and the rest are set to zero. The $a(L^*a^*b^*)$ function is then smoothed with multi-dimensional filtering techniques according to the effects desired by the composite gamut mapping function.

At step 322, the blending of the gamut mapping functions of the different clusters produces a composite gamut mapping function. The composite gamut mapping function includes the optimized gamut mapping functions associated with each defined cluster to be blended. The composite mapping strategy produced has been optimized to effectively exploit the local advantages of each cluster. One embodiment produces the composite gamut mapping function by outputting, for example, a memory based look-up table (LUT), a piecewise defined multi-dimensional function, or any suitable output format desired for the intended application of the compute gamut mapping function.

Figure 4:
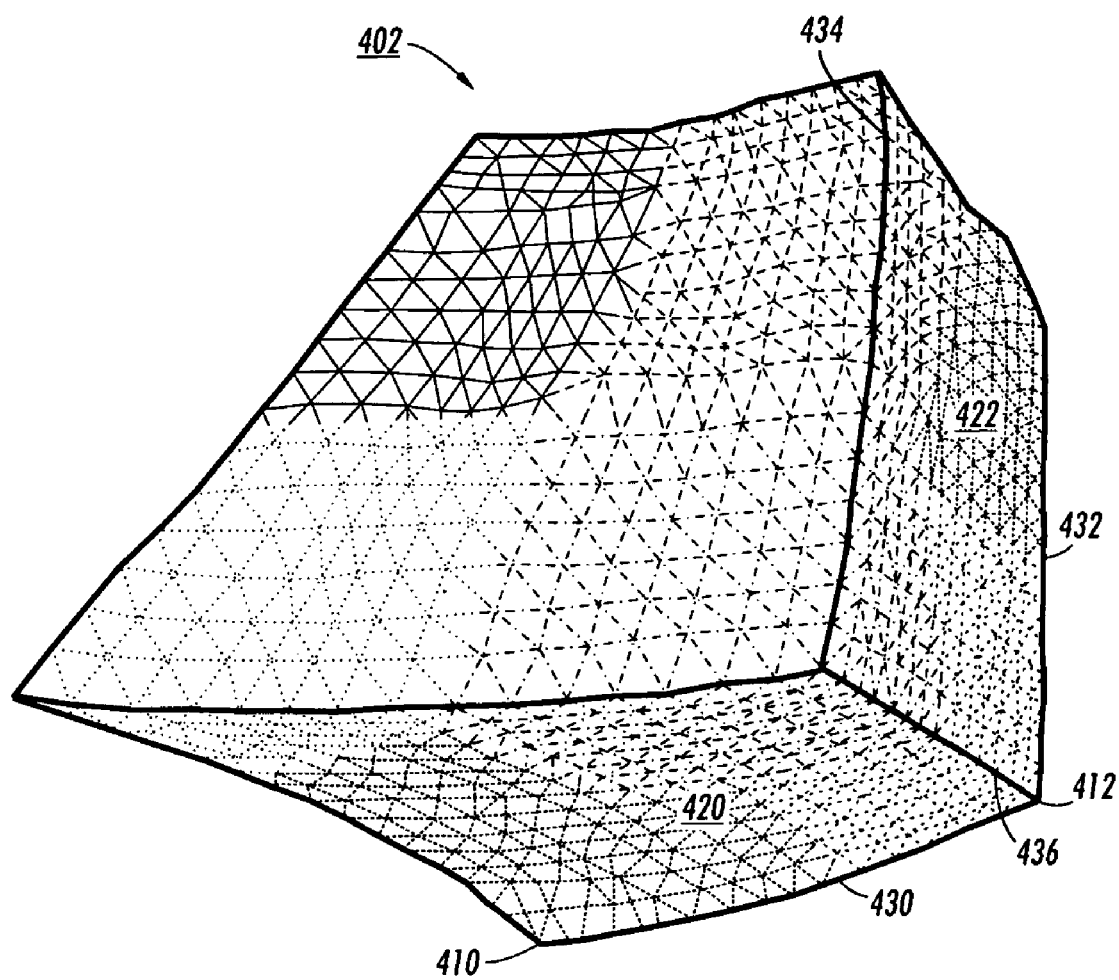
FIG. 4 illustrates an example color space with a generic CMYK printer gamut.

Reference is now being made to FIG. 4 which illustrates an example color space with a generic CMYK printer gamut. Although the illustrated example includes a color space with a generic CMYK printer gamut, further embodiments are able to apply the discussed processing for displays that have any number of colors, including printers having more than four colors.

The example color space with a generic CMYK printer gamut 402 that includes 14 corners, 24 edges, and 12 faces. Of these features, a first corner 410, and a second corner 412 are shown. The example color space with a generic CMYK printer gamut further shows a first edge 430, a second edge 432, a third edge 434 and a forth edge 436 along with a first face 420 and a second face 422. An example cluster definition defines clusters in or around the vicinity of the corners, edges, and faces. Such a definition is motivated by an observation that different gamut mapping algorithms tend to be optimum for these different regions. This example defines one cluster for the first corner, another cluster for the second corner, and so forth, for each of the 14 corners. One cluster is also defined for the first face, another cluster is defined for the second face, and so forth, for each of the 12 faces. A cluster is defined for points near each edge. Thus, one cluster is defined for points near the first edge, another cluster for points near the second edge, another for points hear the third edge, another cluster for points near the fourth edge, and so forth, for each of the 24 edges. In the above example, a total of 50 clusters are defined (14+24+12=50).

Various known techniques can be used to define out-of-gamut clusters for a generic CMYK printer gamut with the above number of corners, edges, and faces. For example, a K-means algorithm can be used to implement a self-clustering algorithm to define clusters of out-of-gamut color points. Alternative cluster definition techniques involve cluster color points based on each point's location relative to one of the corners, edges, or faces of the gamut. In one example, a cluster definition technique defines a separate respective cluster for color points near each corner and edge, and defines one cluster for points that are not near a corner or edge. Another cluster definition defines a separate cluster for color points near each corner, each edge and each face of the gamut, as in the above example.

The generated composite mapping function or the values thereof may be retained in a convenient lookup table. The lookup table may be stored in memory or on a storage media for easy access and data retrieval. The lookup table can be designed to have entries which contain specifications of the target color points within the target gamut for each input color point within the defined clusters of the input color space. In operation, a received input color point for each cluster in the input color space would be used to access the lookup table. Depending on the construct of the lookup table and the implementation, the input color points may be further manipulated prior to referencing the lookup table to, for example, correct boundary conditions, and the like. Other embodiments for storing the data produced by the composite gamut mapping strategy generated by an implementation hereof are envisioned. An input color point retrieved or otherwise obtained for the input image can thereafter by quickly mapped by the color management system to the target gamut of the target color device or image output device.

Figure 5:
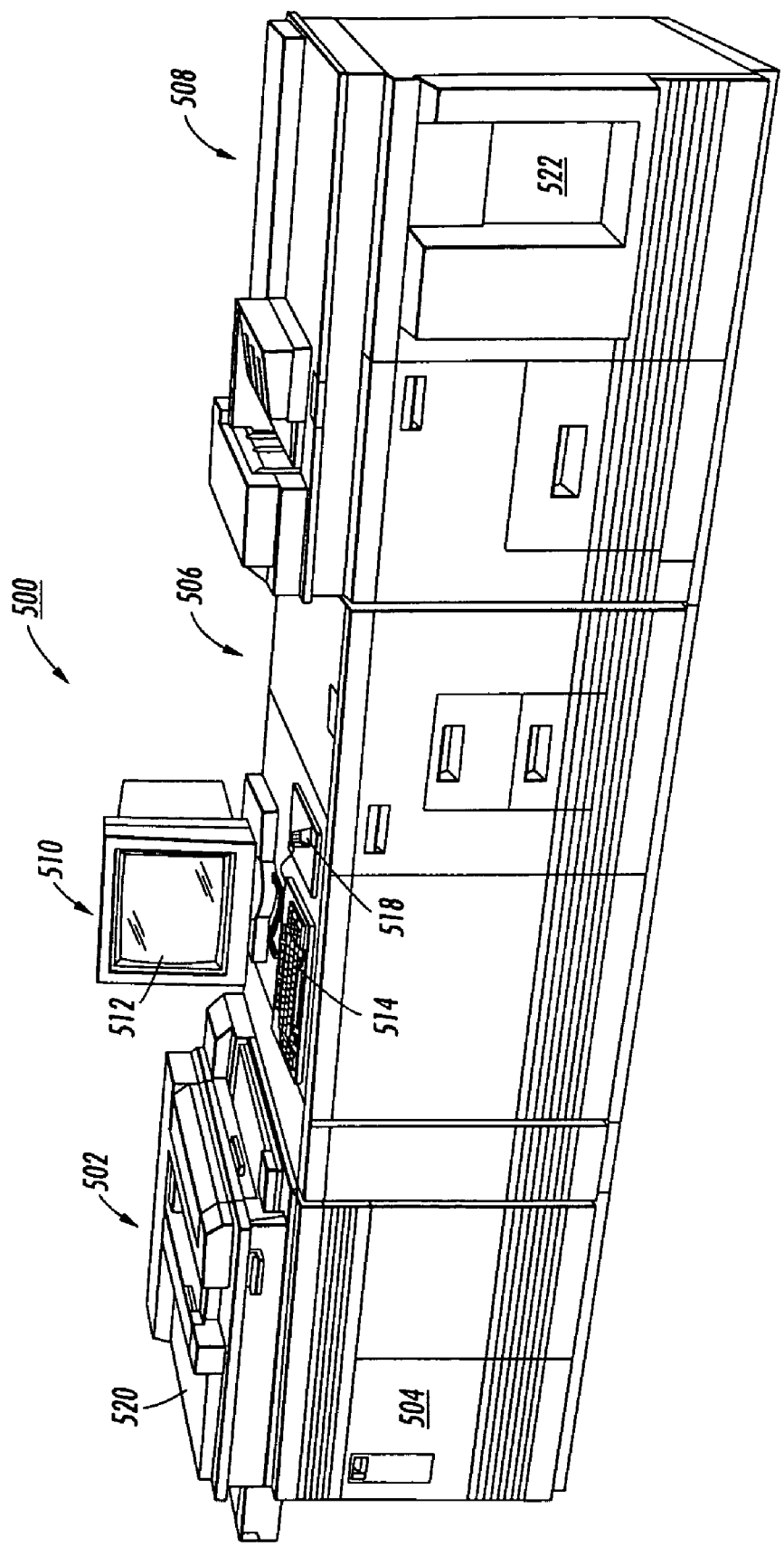
FIG. 5 illustrates one document reproduction system wherein various embodiments of the present method are likely to find their intended uses.

Reference is now being made to FIG. 5 which illustrates one example document reproduction system wherein various embodiments of the present method are likely to find their intended uses.

The document reproduction system 500 includes an input module 502 having a controller 504, a document processing module 506, and a printer module 508. The document processing module includes a document processing station 510 that includes a display 512, a keyboard 514, and a mouse 518. A scanning device 520 is used to scan a document or an image. The document processing station may be used by an operator to set parameters or scan operations and other document processing and document printing operations. The instructions for these various operations may be input via the keyboard and/or mouse, or touch screen objects displayed on the display. The document processing station also includes a processor having memory and secondary storage, such as a disk drive, for storage of programs and data required for processing documents through the system. In one embodiment, the document processing station includes a computer workstation that is suitable for performing the methods described herein. The printer module 508 also includes processors and controllers for regulating the application of inks or toners onto paper as well as the control of papers moving through the printer module for proper registration in multi-channel color printing, and the like. The document process system further includes one or more discharge areas 522 where finished documents are deposited for retrieval. The system 500 may also include a network connection (not shown) for receiving color data points over a network such as an intranet or internet.

A controller 504 (internal to system 500) monitors and regulates the operation of the scanning device for obtaining the pixel data input points of the color image to be mapped.

The controller may also be designed or programmed to cause the document processing system to carry out various features, embodiments, and enhancements to any of the block diagram of FIG. 2 and the flow diagrams of FIGS. 1 and 3, described above. The controller may also be placed in digital communication with one or more electronic media readers for the input of image data from storage such as a CD-ROM or magnetic disk.

In one embodiment, the document reproduction system includes a special purpose processor for carrying out the present method. Such a special purpose processor is capable of executing machine executable program instructions. The processor is in communication with a main memory to store machine readable instructions for executing various features and embodiments hereof. The main memory may alternatively include random access memory (RAM) to support reprogramming and flexible data storage. The processor may also be in communication with a secondary memory. The secondary memory may include a hard disk drive or a removable storage drive which reads and writes to a removable storage unit such as a floppy disk, magnetic tape, optical disk, etc. The secondary memory may further include other similar mechanisms for allowing computer programs or other instructions to be loaded into the computer system. Such mechanisms may include a program cartridge and interface, a removable memory chip and associated socket, and other removable units and interfaces which allow software and data to be transferred to the processor or controller of system 500.

One or both of the controller and special purpose processor may comprise any of a micro-processor or micro-controller, an ASIC, an electronic circuit, or special purpose computer. Such a computer can be integrated, in whole or in part, with, for example, a xerographic system or a color management or image processing software or system, which includes a processor capable of executing machine readable program instructions for carrying out one or more aspects of the present method. All or portions of the diagrams of the present method, as illustrated herein, may be implemented partially or fully in hardware in conjunction with machine executable instructions in communication with various components of system 500.

The document reproduction system 500 also includes a communications interface (not shown) which acts as both an input and an output to allow software and data to be transferred between the system and external devices. Examples of a communications interface include a modem, a network interface (such as an Ethernet card), a communications port, a PCMCIA slot and card, etc. Software and data transferred via the communications interface are in the form of signals which may be, for example, electronic, electromagnetic, optical, or other signals capable of being received by the communications interface. These signals are provided via a communications path which carries such signals and may be implemented using wire, cable, fiber optic, phone line, cellular link, RF, or other communications links.

Terms such as, computer program medium, computer executable medium, computer usable medium, and computer readable medium, are used herein to broadly refer to media such as main memory and secondary memory, removable storage drive, a hard disk installed in a hard disk drive, and signals. These computer program products are means for providing instructions and/or data to the computer system. The computer readable medium is further capable of storing data, machine instructions, message packets, or other machine readable information, and may include non-volatile memory, such as a floppy, ROM, flash memory, disk memory, CD-ROM, and other permanent storage useful, for example, for transporting information, such as data and computer instructions. A computer usable or machine readable media is, for example, a floppy disk, a hard-drive, memory, CD-ROM, DVD, tape, cassette, or other digital or analog media, or the like, which is capable of having embodied thereon a computer readable program, one or more logical instructions, or other machine executable codes or commands that implement and facilitate the function, capability, and methodologies described herein.

The computer readable medium may additionally comprise computer readable information in a transitory state medium such as a network link and/or a network interface, including a wired network or a wireless network, which allows the computer system to read such computer readable information. Computer programs (also called computer control logic) may be stored in main memory and/or secondary memory. Computer programs may also be received via the communications interface. Such computer programs, when executed, enable the computer system to perform one or more aspects and other features and capabilities of the present methods as provided herein.

It should be understood that the teachings hereof can be implemented in hardware or software using any known or later developed systems, structures, devices, and/or software by those skilled in the applicable art without undue experimentation from the functional description provided herein with a general knowledge of the relevant arts.

The methods hereof may be partially or fully implemented in software using object or object-oriented software development environments that provide portable source code that can be used on a variety of computer, workstation, server, network, or other hardware platforms. For example, the methods hereof can be implemented as a routine embedded on a personal computer or as a resource residing on a server or workstation, such as a routine embedded in a plug-in, a printer, a photocopier, a driver, a scanner, a photographic system, a xerographic device, or the like. One or more of the capabilities hereof can be emulated in a virtual environment as provided by an operating system, specialized programs, or from a server.

One or more aspects of the methods described herein are intended to be incorporated in an article of manufacture, including one or more computer program products, having computer usable or machine readable media. The article of manufacture may be included on at least one storage device readable by machine architectures or other xerographic or image processing systems embodying executable program instructions capable of performing one or more aspects of the present method, as described herein. The article of manufacture may be included as part of a xerographic system, an operating system, a plug-in, or may be shipped, sold, leased, or otherwise provided separately either alone or as part of an add-on, update, upgrade, or product suite.

It will be appreciated that the above-disclosed and other features and functions, or alternatives thereof, may be desirably combined into many other different systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Various changes to the above-described embodiments may be made without departing from the spirit and scope of the invention.

What is claimed is:

1. A method for merit-based gamut mapping, the method comprising:
    defining a plurality of clusters in a color space wherein each cluster has a plurality of color points, the plurality of clusters comprising at least a first cluster and a second cluster;
    associating at least one respective gamut mapping function with each cluster, each respective gamut mapping function comprising a respective function that is applied to each point in the cluster with which the respective gamut function is associated to define a respective point within a target gamut that corresponds to at least one color point within the cluster with which the respective gamut function is associated, wherein
        the first cluster is associated with a first gamut mapping function that comprises a first function that defines a respective point within a target gamut that corresponds to at least one color point within the first cluster,
        the second cluster is associated with a second gamut mapping function that comprises a second function that defines a respective point within a target gamut that corresponds to at least one color point within the second cluster, and
        the first gamut mapping function being different than the second gamut mapping function;
    associating at least one merit function with each cluster, the merit function defining at least one merit function value for the respective gamut mapping function associated with each cluster;
    optimizing the respective gamut mapping function for each respective cluster based on the determined merit function value;
    blending, after the optimizing, gamut mapping functions of adjacent clusters; and
    outputting, after the optimizing, at least one composite gamut mapping function comprising the gamut mapping function for each respective cluster within the plurality of clusters.

2. The method of claim 1, wherein the first gamut mapping function has a first mapping parameter and the second mapping function has a second mapping parameter,
    wherein altering the first mapping parameter alters the first function that defines the respective point within the target gamut that corresponds to at least one color point within the first cluster,
    wherein altering the second mapping parameter alters the second function that defines the respective point within the target gamut that corresponds to at least one color point within the second cluster,
    and wherein optimizing the respective gamut mapping function for each respective cluster comprises:
        adjusting the first mapping parameter to equal an adjusted first mapping parameter;
        determining a first merit function value for the first gamut mapping function using the adjusted first mapping parameter;
        adjusting, independently of adjusting the first mapping parameter, the second mapping parameter to equal an adjusted second mapping parameter;
        determining a second merit function value for the second gamut mapping function using the adjusted second mapping parameter; and
        repeating the adjusting the first mapping parameter, the determining the first merit function value, the adjusting the second mapping parameter value and the determining the second merit function value until the first gamut mapping function and the second gamut mapping function have has been optimized as determined by the merit function value.

3. The method of claim 1, wherein blending optimized gamut mapping functions comprises blending at least one mapping parameter of the gamut mapping function for the first cluster with at least one mapping parameter of the gamut mapping function associated with the adjacent cluster for that same color point, wherein the blending further comprises altering the first gamut mapping function associated with the first cluster to incorporate a weighted value of the gamut mapping function associated with the adjacent cluster.

4. The method of claim 1, wherein the associating the at least one respective gamut mapping function with each cluster comprises associating, with at least one cluster within the plurality of clusters, a plurality of candidate gamut mapping functions, and
wherein optimizing the gamut mapping function comprises selecting, for the at least one cluster with which the plurality of candidate gamut mapping functions is associated, an optimum gamut mapping function from the plurality of candidate gamut mapping functions.

5. The method of claim 4, wherein the plurality of candidate gamut mapping functions comprises at least one gamut mapping function with no mapping parameters.

6. The method of claim 1, wherein the merit function value is determined by a color difference value between at least one color point in the cluster and the corresponding point in the target gamut produced by the respective gamut mapping function for the cluster.

7. The method of claim 1, further comprising using the composite gamut mapping function to map individual color points to color points in the target gamut.

8. A system for merit-based gamut mapping, the system comprising:
a storage medium capable of storing data; and
a processor in communication with said storage medium, said processor capable of executing a machine readable instruction for performing the method of:
defining a plurality of clusters in a color space wherein each cluster has a plurality of color points, the plurality of clusters comprising at least a first cluster and a second cluster;
associating at least one respective gamut mapping function with each cluster, each respective gamut mapping function comprising a respective function that is applied to each point in the cluster with which the respective gamut function is associated to define a respective point within a target gamut that corresponds to at least one color point within the cluster with which the respective gamut function is associated, wherein
the first cluster is associated with a first gamut mapping function that comprises a first function that defines a respective point within a target gamut that corresponds to at least one color point within the first cluster,
the second cluster is associated with a second gamut mapping function that comprises a second function that defines a respective point within a target gamut that corresponds to at least one color point within the second cluster, and
the first gamut mapping function being different than the second gamut mapping function;
associating at least one merit function with each cluster, the merit function defining at least one merit function value for the respective gamut mapping function associated with each cluster;
optimizing the respective gamut mapping function for each respective cluster based on the determined merit function value;
blending, after the optimizing, gamut mapping functions of adjacent clusters; and
outputting, after the optimizing, at least one composite gamut mapping function comprising the gamut mapping function for each respective cluster within the plurality of clusters.

9. The system of claim 8, wherein the first gamut mapping function has a first mapping parameter and the second mapping function has a second mapping parameter,
wherein altering the first mapping parameter alters the first function that defines the respective point within the target gamut that corresponds to at least one color point within the first cluster,
wherein altering the second mapping parameter alters the second function that defines the respective point within the target gamut that corresponds to at least one color point within the second cluster,
and wherein optimizing the respective gamut mapping function for each respective cluster comprises:
adjusting the first mapping parameter to equal an adjusted first mapping parameter;
determining a first merit function value for the first gamut mapping function using the adjusted first mapping parameter;
adjusting, independently of adjusting the first mapping parameter, the second mapping parameter to equal an adjusted second mapping parameter;
determining a second merit function value for the second gamut mapping function using the adjusted second mapping parameter; and
repeating the adjusting the first mapping parameter, the determining the first merit function value, the adjusting the second mapping parameter value and the determining the second merit function value until first gamut mapping function and the second gamut mapping function have been optimized as determined by the merit function value.

10. The system of claim 8, wherein blending optimized gamut mapping functions comprises blending at least one mapping parameter of the gamut mapping function for the first cluster with at least one mapping parameter of the gamut mapping function associated with the adjacent cluster for that same color point, wherein the blending further comprises altering the first gamut mapping function associated with the first cluster to incorporate a weighted value of the gamut mapping function associated with the adjacent cluster.

11. The system of claim 8, wherein the associating the at least one respective gamut mapping function with each cluster comprises associating, with at least one cluster within the plurality of clusters, a plurality of candidate gamut mapping functions, and
wherein optimizing the gamut mapping function comprises selecting, for the at least one cluster with which the plurality of candidate gamut mapping functions is associated, an optimum gamut mapping function from the plurality of candidate gamut mapping functions.

12. The system of claim 11, wherein the plurality of candidate gamut mapping functions comprises at least one gamut mapping function with no mapping parameters.

13. The system of claim 8, wherein the merit function value is determined by a color difference value between at least one color point in the cluster and the corresponding point in the target gamut produced by the respective gamut mapping function for the cluster.

14. The system of claim 8, further comprising using the composite gamut mapping function to map individual color points to color points in the target gamut.

15. A computer program product for merit-based gamut mapping, the computer program product comprising:
   a non-transitory computer usable medium capable of storing instructions that, when executed on a computer, cause the computer to perform a method comprising:
   defining a plurality of clusters in a color space wherein each cluster has a plurality of color points, the plurality of clusters comprising at least a first cluster and a second cluster;
   associating at least one respective gamut mapping function with each cluster, each respective gamut mapping function comprising a respective function that is applied to each point in the cluster with which the respective gamut function is associated to define a respective point within a target gamut that corresponds to at least one color point within the cluster with which the respective gamut function is associated, wherein
      the first cluster is associated with a first gamut mapping function that comprises a first function that defines a respective point within a target gamut that corresponds to at least one color point within the first cluster,
      the second cluster is associated with a second gamut mapping function that comprises a second function that defines a respective point within a target gamut that corresponds to at least one color point within the second cluster, and
      the first gamut mapping function being different than the second gamut mapping function;
   associating at least one merit function with each cluster, the merit function defining at least one merit function value for the respective gamut mapping function associated with each cluster;
   optimizing the respective gamut mapping function for each respective cluster based on the determined merit function value;
   blending, after the optimizing, gamut mapping functions of adjacent clusters; and
   outputting, after the optimizing, at least one composite gamut mapping function comprising the gamut mapping function for each respective cluster within the plurality of clusters.

16. The computer program product of claim 15, wherein the first gamut mapping function has a first mapping parameter and the second mapping function has a second mapping parameter,
   wherein altering the first mapping parameter alters the first function that defines the respective point within the target gamut that corresponds to at least one color point within the first cluster,
   wherein altering the second mapping parameter alters the second function that defines the respective point within the target gamut that corresponds to at least one color point within the second cluster,
   and wherein optimizing the respective gamut mapping function for each respective cluster comprises:
      adjusting the first mapping parameter to equal an adjusted first mapping parameter;
      determining a first merit function value for the first gamut mapping function using the adjusted first mapping parameter;
      adjusting, independently of adjusting the first mapping parameter, the second mapping parameter to equal an adjusted second mapping parameter;
      determining a second merit function value for the second gamut mapping function using the adjusted second mapping parameter; and
   repeating the adjusting the first mapping parameter, the determining the first merit function value, the adjusting the second mapping parameter value and the determining the second merit function value until the first gamut mapping function and the second gamut mapping function have been optimized as determined by the merit function value.

17. The computer program product of claim 15, wherein blending optimized gamut mapping functions comprises blending at least one mapping parameter of the gamut mapping function for the first cluster with at least one mapping parameter of the gamut mapping function associated with the adjacent cluster for that same color point, wherein the blending further comprises altering the first gamut mapping function associated with the first cluster to incorporate a weighted value of the gamut mapping function associated with the adjacent cluster.

18. The computer program product of claim 15, wherein the associating the at least one respective gamut mapping function with each cluster comprises associating, with at least one cluster within the plurality of clusters, a plurality of candidate gamut mapping functions, and
   wherein optimizing the gamut mapping function comprises selecting, for the at least one cluster with which the plurality of candidate gamut mapping functions is associated, an optimum gamut mapping function from the plurality of candidate gamut mapping functions.

19. The computer program product of claim 18, wherein the plurality of candidate gamut mapping functions comprises at least one gamut mapping function with no mapping parameters.

20. The computer program product of claim 15, wherein the merit function value is determined by a color difference value between at least one color point in the cluster and the corresponding point in the target gamut produced by the respective gamut mapping function for the cluster.

* * * * *